July 23, 1929.　　　G. F. SCHNELL　　　1,721,835
LOG STOP
Filed Feb. 5, 1927
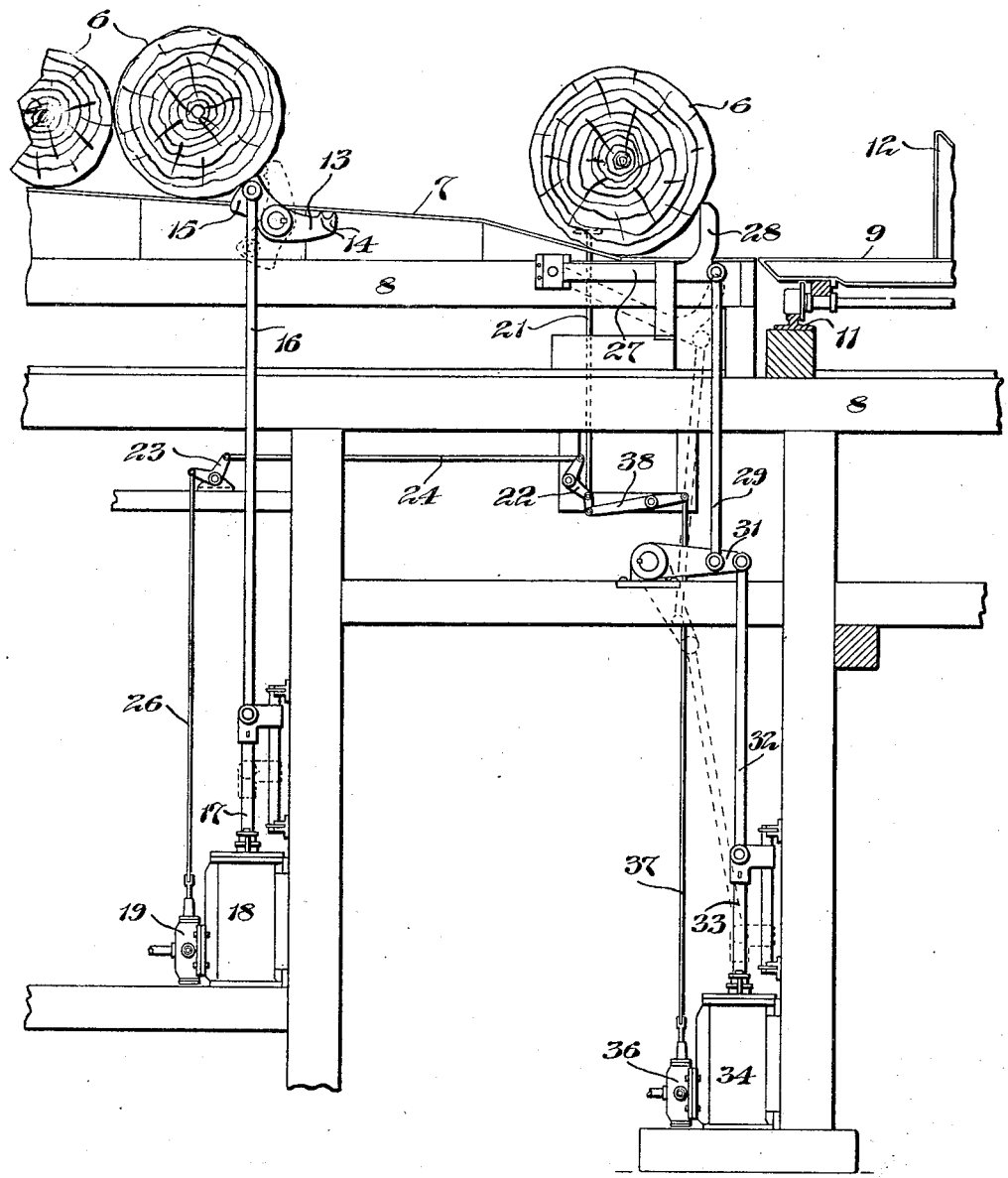
INVENTOR:
George F. Schnell
BY
White Prost + Dryer
his ATTORNEYS.

Patented July 23, 1929.

1,721,835

UNITED STATES PATENT OFFICE.

GEORGE F. SCHNELL, OF DIAMOND SPRINGS, CALIFORNIA.

LOG STOP.

Application filed February 5, 1927. Serial No. 166,160.

My invention relates to log handling machinery and especially to mechanism for aiding in the handling of logs as they descend gravitally from a log deck onto a saw table. Cut timber as it comes into a saw mill, is usually conveyed in a horizontal position to the upper end of an inclined platform, termed a log deck. At the lower end of the log deck the saw table is situated and is adapted to move transversely of the log deck and convey the logs to the saw where they are cut into lumber. A device called a log loader is usually provided for releasing the logs one by one to roll down the log deck onto the saw table. The log deck is usually given a considerable pitch to insure that the irregular shaped logs will be conveyed gravitally onto the saw table. The logs are of large size ordinarily, and gain considerable momentum rolling down the log deck, especially if they are substantially circular. In order to arrest the motion of the logs and keep them in proper position for sawing, an abutment is placed on the saw table which acts as a barrier for the logs rolling down the inclined deck. The barrier on the saw table is subject to considerable impact in stopping the rapidly rolling logs, and the entire saw table mechanism and associated machiney are jarred and otherwise disturbed.

It is therefore an object of my invention to provide means for reducing the impact on the saw table of logs rolling down the inclined log deck associated therewith.

Another object of my invention is to provide a log stop which will operate in conjunction with a log loader and can be controlled by the same operator.

My invention possesses other advantageous features, some of which with the foregoing, will be set forth at length in the following description where I shall outline in full that form of the log stop of my invention, which I have selected for illustration in the drawings accompanying and forming part of the present specification. In said drawings I have shown one form of log stop embodying my invention, but it is to be understood that I do not limit myself to such form since the invention, as set forth in the claims, may be embodied in a plurality of forms.

In the drawings:

The figure shows in cross section a log deck and a portion of an associated saw table, the major portions of the device of my invention installed therewith being illustrated in side elevation.

The log stop of my invention preferably comprises a barrier adapted to be operated in conjunction with the log loader usually provided on a log deck for retarding the motion of logs rolling down the deck.

In the preferred embodiment of my invention disclosed in the drawing, the logs 6 in coming to the mill, are deposited in horizontal position on the upper end of the log deck 7. The log deck is suitably supported on underpinning 8 and is inclined to cause the logs to roll gravitally toward the saw table 9. The saw table is adapted to run on rails 11 supported by the underpinning 8 and is provided at one side with a back stop 12 to position logs for sawing.

The log loader usually provided for releasing the logs 6 one at a time to roll down the deck 7 onto the saw table 9 preferably comprises a dog 13 pivotally mounted just below the surface of the deck 7 and adapted to be rotated in the direction of motion of the logs 6. One end of the dog is formed with a plurality of teeth 14 and the other end 15 is shaped to bear against one of the logs 6. The dog is located to act in either of two positions as a barrier for logs. One of the positions is shown in full lines in the drawings, and the other position is indicated in dotted lines. The dog 13 is rotated about its pivot by a rod 16 joined to the piston rod 17 of a fluid pressure cylinder 18.

The pressure cylinder is operated hydraulically or by steam or compressed air, the working fluid flowing into and out of the cylinder 18 under control of a suitable valve 19. Valves and cylinders for use with my invention are well known and are therefore not specifically described. Upon manipulation of the valve 19, pressure fluid is admitted or discharged from the cylinder 18 and thru the rod 16 correspondingly oscillates the dog 13. Control of the valve 19 is in the hands of an operator who, by depressing a pedal 21, actuates linkage including bell crank levers 22 and 23 connected by a rod 24 and joined to the valve by a rod 26 thereby regulating the position of the dog 13.

Upon depression of the pedal 21, the dog is oscillated to its position as shown in full lines on the drawing. Release of the pedal causes the dog to be rotated back to its dotted line position in the drawing in a direction opposite to the direction in which the logs 6 roll down the deck. Inasmuch as the return movement of the dog 13 is against the direction the logs roll, they are not released on the return movement of the dog but are caught and held by the teeth 14. A second depression of the pedal 21 again moves the dog in the direction of motion of the logs, and the first log 6 rolls down the deck over the depressed dog 13 and continues toward the saw table 9. The end 15 of the dog has in the meantime projected above the surface of the deck 7 and obstructs the further advance of the succeeding log 6. By this mechanism, means are provided for releasing the logs one at a time.

My invention includes the provision of means for arresting the motion of the descending logs and absorbing the greater portion of the momentum which otherwise would subject the saw table to destructive jars and stresses. In some installations of this kind, a device is provided adjacent the saw table for aiding in positioning the logs on the saw table. This device is termed the "nigger" of which the Simondson nigger is an example. The nigger and its associated mechanism requires considerable room beneath the log deck adjacent the saw table and for that reason the log stop of my invention is installed so as not to interfere with the operation of the nigger.

My log stop preferably comprises a substantially horizontal arm 27 pivoted to the underpinning 8 below the deck 7. At the end of the arm an upstanding finger 28 is formed which projects a considerable distance above the log deck and forms a barrier for the descending logs. At the end of the lever adjacent the finger a rod 29 connects with an intermediate arm 31 also pivoted to the underpinning 8 and joined to a rod 32 which connects with the piston rod 33 of a fluid pressure cylinder 34. The cylinder 34 is similar to the cylinder 18 and is also controlled by means of a valve 36 linked thru a rod 37 and a lever 38 with the bell crank 22 connected to the controller 21.

The described linkage is so arranged that upon depression of the pedal 21, the valve 36 is operated simultaneously with the valve 19 and pressure fluid is coincidentally admitted to the cylinders 18 and 34. For that reason the finger 28 is in its full-line position when the dog 13 is in its full-line position and, correspondingly, the finger 28 is withdrawn below the log deck 7 as the dog 13 assumes its dotted line position, as indicated in the figure.

When a log is released by rotation of the dog 13 from its dotted line position to its full-line position, it rolls down the inclined log deck and strikes the barrier formed by the upstanding finger 28. Its momentum is absorbed in the impact with the upstanding finger of the log stop. The initial log released by the dog 13 upon depression of the pedal 21 is stopped by the finger 28 while the succeeding log is stopped by the barrier formed by the end 15 of the dog. Upon release of the pedal by the operator, the finger 28 is withdrawn below the log deck 7 releasing the initial log 6 onto the saw table 9 where it is held for sawing and, at the same time, the dog 13 returns from its full-line position to its dotted line position ready for a repetition of the described cycle.

Inasmuch as the elevation of the log 6 released by the finger 28 is comparatively slight with respect to the saw table 9, its momentum is small as it arrives at the back stop 12 and its impact is correspondingly slight. As an alternative construction the log 6 stopped by the finger 28 can be rolled onto the saw table 9 with the aid of a Simondson nigger, as described.

It will be understood that although but one dog 13 and one finger 28 are shown in the drawing, a plurality of dogs and fingers are preferably provided and are spaced transversely of the inclined log deck 7. They are controlled by cylinders 18 and 34 as shown and are preferably interlinked and operate in the same relationship described. While I have illustrated an interconnecting linkage which affords simultaneous operation of the cylinders 18 and 34, it will be appreciated that a lost motion interconnection can be provided to afford a time lag of any desired proportions between the operation of one of the cylinders and the operation of the other cylinder.

It will be appreciated that the log stop of my invention is interconnected with the log loader ordinarily provided and they are both simultaneously operated by the same operator who usually controls the log loader. The log stop of my invention checks the impetus of the logs rolling down the log deck and saves the sawing table from considerable impact.

I claim:

1. A log stop comprising an inclined log deck, a pair of barriers at different elevations on said deck, and means for operating said barriers simultaneously.

2. A log stop comprising a log deck over which logs are adapted to move, a pair of barriers spaced apart in the direction of motion of said logs, and means for operating said barriers in conjunction.

3. A log stop comprising an inclined log deck, a barrier on said deck, means for erecting said barrier, a second barrier on said deck, means for erecting said second barrier, and a manually operable control for regulating both of said means.

4. A log stop comprising an inclined log deck, a barrier on said deck, a fluid pressure cylinder for operating said barrier, a second barrier on said deck, a second fluid pressure cylinder for operating said second barrier, and means for simultaneously controlling the flow of pressure fluid to said cylinders.

5. A log stop comprising an inclined log deck, a pair of barriers successively effective in halting logs rolling on said deck, and manually operable means for simultaneously controlling said pair of barriers.

6. A log stop comprising an inclined log deck, a barrier adjacent one end of said deck, a second barrier considerably spaced from the end of said deck, fluid pressure cylinders for operating said barriers, and linkage for actuating said cylinders in predetermined time relationship.

7. A log stop comprising an inclined log deck, a log loader on said deck including a dog mounted for rotational movement with respect to said deck, a stop on said deck including a finger arranged for movement substantially perpendicular with respect to said deck, and means for operating said loader and said stop in conjunction.

8. A log stop comprising an inclined log deck, a dog mounted on said deck to rotate in the direction of motion of logs passing over said deck, a finger mounted on said deck to project into the path of logs passing over said deck, and manually controlled, fluid pressure operated means for actuating said dog and said finger.

9. A log stop comprising an inclined log deck, a barrier on said deck, a valve-controlled, fluid pressure operated cylinder for actuating said barrier, a second barrier on said deck, a second valve-controlled fluid-pressure operated cylinder for actuating said second barrier, a manually operable controller, and linkage interconnecting said valves and said controller.

In testimony whereof, I have hereunto set my hand.

GEO. F. SCHNELL.